Patented Aug. 16, 1932

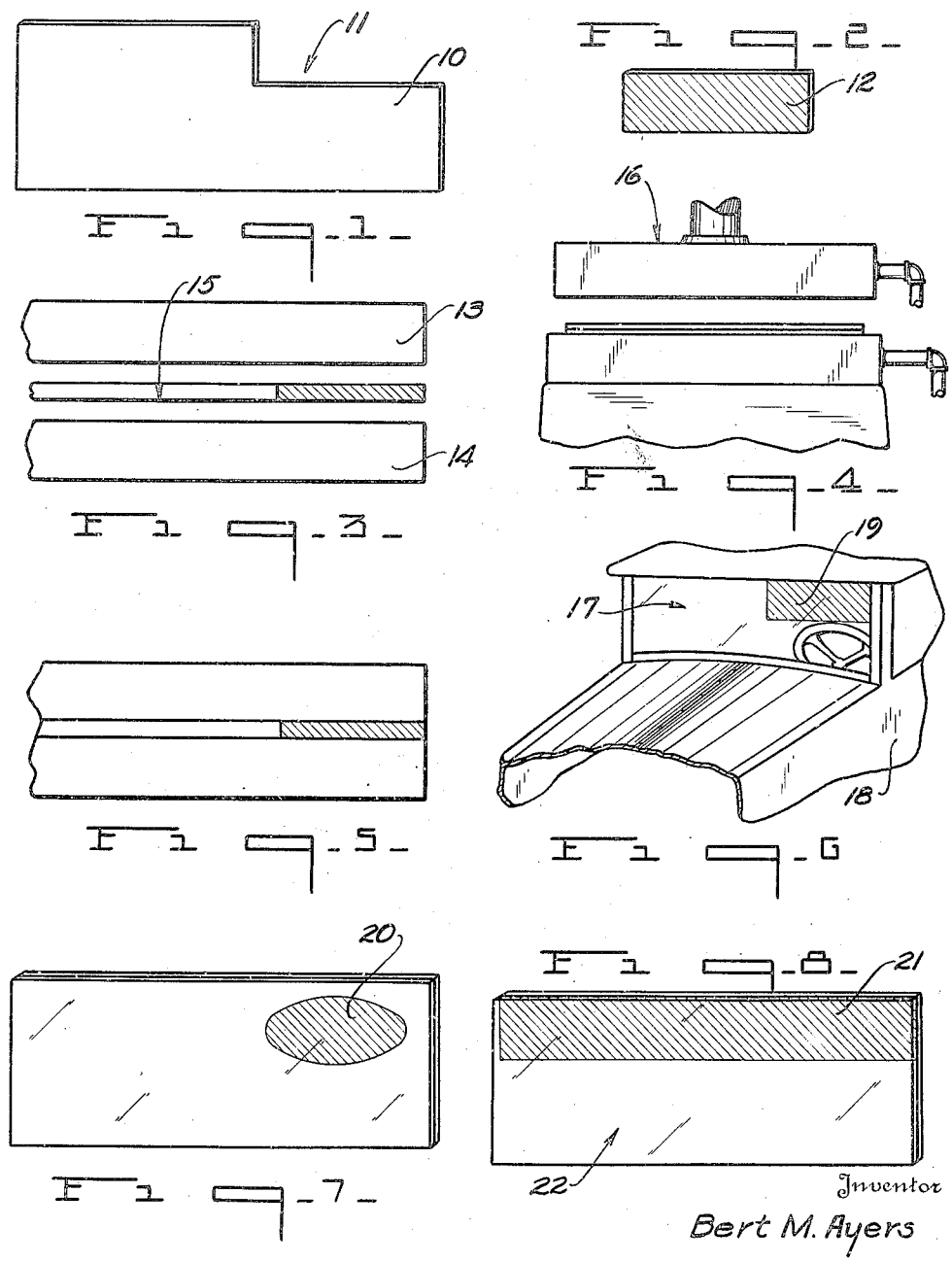

1,872,553

UNITED STATES PATENT OFFICE

BERT M. AYERS, OF TOLEDO, OHIO, ASSIGNOR TO LIBBEY-OWENS-FORD GLASS COMPANY, OF TOLEDO, OHIO, A CORPORATION OF OHIO

LAMINATED GLASS AND PROCESS OF PRODUCING THE SAME

Application filed January 19, 1928. Serial No. 247,818.

The present invention relates to laminated glass and to the process of producing the same.

An important object of the invention is to provide as a new article of manufacture, a sheet of laminated glass including a non-glare area.

Another object of the invention is to provide as a new article of manufacture, a sheet of laminated glass including a non-brittle lamination, said non-brittle lamination having a non-glare area.

Still another object of the invention is to provide such a sheet of laminated glass, wherein a lamination of non-brittle material is used, said non-brittle lamination including a substantially colorless area and a non-glare area having the desired color or tint.

Other objects and advantages of the invention will become more apparent during the course of the following description when taken in connection with the accompanying drawing.

In the drawing wherein like numerals are employed to designate like parts throughout the same, Figure 1 is a perspective view illustrating a non-brittle lamination having a cut-out portion shown therein.

Figure 2 is a perspective view illustrating one form of non-glare insert which may be used.

Figure 3 illustrates diagrammatically the laminations used in accordance with the present invention and before they have been united.

Figure 4 is a diagrammatic representation of a form of press which may be used to unite the laminations.

Figure 5 is a fragmentary view illustrating diagrammatically the laminations after they have been united.

Figure 6 is a fragmentary perspective view illustrating an automotive vehicle showing how the invention may be used.

Figure 7 is a perspective view showing a slightly modified form of the invention, and Figure 8 is a similar view illustrating still another form of the invention.

Although the present invention is not in any way limited to any particular use it has decided advantages for use in automotive vehicles such as automobiles and particularly for use in the so-called windshields of such vehicles.

One of the advantages to be gained by use of the present invention is to provide a sheet of laminated glass including an area that will permit night-driving with more ease than in the past. Reference is made particularly to the glare and blinding lights of approaching vehicles when driving at night. To overcome this glare, I produce a sheet of laminated glass having a non-glare area. The term non-glare is used to designate an area which noticeably reduces glare.

Referring more particularly to the drawing, the numeral 10 designates a sheet of non-brittle material, which is provided with a cut-out portion 11 as shown in Figure 1. The present case does not refer to any particular method of joining the laminations nor the specific type of non-brittle material used in the production of a sheet of laminated glass, however, by way of example, I mention the use of non-brittle material such as cellulose composition material. The use of cellulose composition material is common in the commercial production of laminated glass and is considered substantially colorless, in that when combined with one or more sheets of glass it gives a transparent sheet glass suitable for use in those places where ordinary glass is used. Laminated glass is desirable particularly in vehicles because of its non-shatterable features.

In Figure 2 is shown an insert 12 of a size and thickness adapted to be set in the cut-out portion 11 of the sheet 10, and is preferably of a material similar to the non-brittle sheet 10. For instance if the sheet 10 is a cellulose composition material then the insert 12 is formed from a like material, however, although this is desirable it is not necessary to the successful use of this invention. The insert 12 is of a non-brittle character and is preferably colored. One color can be used is a shade of green although obviously any color or tint or shade can be utilized as desired.

In producing the laminated sheet of glass the insert 12 is arranged in proper relation with respect to the major portion of the non-brittle lamination and then the combined sheet arranged between two sheets of glass 13 and 14 in the manner illustrated in Figure 3. Some suitable solvent, cement or other bonding means is used to obtain the necessary bond between the inner non-brittle lamination designated in Figure 3 in its entirety by the numeral 15 and the sheets of glass. One method of uniting the laminations is to use a press designated in its entirety by the numeral 16 in Figure 4 and by means of which press the laminations may be bonded together by the combined action of heat and pressure. Figure 5 illustrates diagrammatically the finished product formed from the laminations in Figure 3. Obviously the bonding medium or mediums used between the laminations will prevent accidental displacement of the insert member or non-glare area with respect to the balance of the finished sheet. Figure 6 indicates one use to which the invention may be placed.

The windshield 17 of the vehicle 18 throughout most of its area is practically colorless while the area 19 is a non-glare area and will prove of considerable value especially during night-driving although of course it will also tend to remove the glare from the sun. The shading used in connection with the inserts is not intended to show that the color of the insert is particularly noticeable, the shading being used merely in a diagrammatic way to indicate that the area is preferably tinted or colored as above pointed out. The insert or non-glare area is colored to just the extent necessary to produce the desired non-glare area.

In Figure 7 is illustrated a slightly modified form of construction wherein a substantially oval insert or non-glare area 20 is used. In Figure 8 a non-glare area 21 extends throughout the entire length of the sheet 22. If such a sheet were used in the vehicle 18 it will be seen that the non-glare feature will be present throughout the entire width of the windshield 17. The location of the non-glare area is preferably such that it will be properly arranged with respect to the eyes of the average individual. Although three different forms of inserts have been illustrated quite naturally many different forms can be worked out. Attention is called to the fact that although the laminated sheet is provided with a non-glare area the outer laminations namely the glass sheets are in no way altered.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:—

1. As a new article of manufacture, a sheet of laminated glass comprising two sheets of transparent glass and a non-brittle lamination arranged therebetween and united thereto, said non-brittle lamination including a substantially colorless portion and a colored portion.

2. As a new article of manufacture, a sheet of laminated glass comprising two sheets of transparent glass, a non-brittle lamination arranged therebetween and united thereto, said non-brittle lamination comprising a substantially colorless member and a cut-out having colored members arranged in said cut-out portion.

3. As a new article of manufacture, an automotive vehicle windshield comprising two sheets of glass and a sheet of non-brittle material interposed therebetween and connected thereto, the non-brittle lamination having a colored portion.

Signed at Toledo, in the county of Lucas, and State of Ohio, this 17th day of January, 1928.

BERT M. AYERS.